United States Patent
Inada et al.

(10) Patent No.: US 11,863,025 B2
(45) Date of Patent: Jan. 2, 2024

(54) RESIN MOLDED ROTOR, CANNED MOTOR, CANNED MOTOR PUMP, FAN SCRUBBER, AND VACUUM PUMP APPARATUS

(71) Applicant: EBARA CORPORATION, Tokyo (JP)

(72) Inventors: Takanori Inada, Tokyo (JP); Kozo Matake, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 227 days.

(21) Appl. No.: 17/342,929

(22) Filed: Jun. 9, 2021

(65) Prior Publication Data

US 2021/0408852 A1 Dec. 30, 2021

(30) Foreign Application Priority Data

Jun. 26, 2020 (JP) .................................. 2020-110723

(51) Int. Cl.
| | |
|---|---|
| *H02K 1/28* | (2006.01) |
| *F04D 13/06* | (2006.01) |
| *F04D 25/06* | (2006.01) |
| *F04D 25/16* | (2006.01) |
| *F04D 19/04* | (2006.01) |

(52) U.S. Cl.
CPC ............ *H02K 1/28* (2013.01); *F04D 13/0606* (2013.01); *F04D 19/046* (2013.01); *F04D 25/06* (2013.01); *F04D 25/16* (2013.01)

(58) Field of Classification Search
CPC .......... H02K 1/28; H02K 15/10; H02K 15/02; H02K 15/03; F04D 13/0606; F04D 19/046; F04D 25/06; F04D 25/16; F04D 19/04; F04D 25/0606

USPC .......................................................... 310/43
See application file for complete search history.

(56) References Cited

U.S. PATENT DOCUMENTS

| | | | |
|---|---|---|---|
| 2007/0177999 A1* | 8/2007 | Fujii | F04C 28/06 |
| | | | 417/410.1 |
| 2012/0326555 A1 | 12/2012 | Arimatsu et al. | |
| 2014/0241914 A1 | 8/2014 | Ojima et al. | |
| 2017/0007961 A1* | 1/2017 | Furuta | H02K 5/1672 |
| 2019/0260245 A1* | 8/2019 | Chamand | H02K 1/278 |

FOREIGN PATENT DOCUMENTS

| | | |
|---|---|---|
| JP | H07-312852 A | 11/1995 |
| JP | 2003259578 | * 12/2003 |
| JP | 2008-187755 A | 8/2008 |
| JP | 2013-009528 A | 1/2013 |
| JP | 5602615 B2 | 10/2014 |

(Continued)

OTHER PUBLICATIONS

English translation of JP2003259578(A), from EPO website, generated May 12, 2023 (Year: 2023).*

*Primary Examiner* — Bryan M Lettman
(74) *Attorney, Agent, or Firm* — PEARNE & GORDON LLP (57) ABSTRACT

A resin molded rotor includes a rotor, a main shaft, and a resin mold. The rotor is configured to hold a magnet. The main shaft is provided with the rotor mounted thereto and is configured to transmit power to the outside. The resin mold is configured to integrally cover the rotor and part of the main shaft on respective sides in an axial direction of the rotor. An O-ring is placed between the resin mold and the main shaft to seal between the resin mold and the main shaft.

8 Claims, 10 Drawing Sheets

(56) References Cited

FOREIGN PATENT DOCUMENTS

| | | | |
|---|---|---|---|
| JP | 6298237 | B2 | 3/2018 |
| JP | 6461733 | A | 1/2019 |
| JP | 2019-037118 | A | 3/2019 |

* cited by examiner

RESIN MOLDED ROTOR, CANNED MOTOR, CANNED MOTOR PUMP, FAN SCRUBBER, AND VACUUM PUMP APPARATUS

TECHNICAL FIELD

The present disclosure relates to a resin molded rotor configured by integrally molding a rotor core, a magnet, and a main shaft with a resin, a canned motor provided with the resin molded rotor, a canned motor pump provided with the canned motor, a fan scrubber provided with the canned motor, and a vacuum pump apparatus provided with the fan scrubber.

BACKGROUND ART

A canned motor is used as a power source of a pump or a fan scrubber and is configured to place a can between a rotor and a stator and to separate a rotor chamber from a stator chamber. The canned motor effectively suppresses leakage of a pump handling liquid to the stator and has characteristics of high safety and long life. A motor rotor is, on the other hand, exposed to the pump handling liquid. In the case of using a corrosive pump handling liquid, there is a need to take into account the corrosion resistance for a main shaft, a rotor core, a permanent magnet and the like constituting the motor rotor. It is possible to use a material having corrosion resistance for, for example, the main shaft of the motor rotor. The rotor core is, however, generally formed of a magnetic steel sheet, and the permanent magnet is made of, for example, a rare earth element. These materials have low corrosion resistance, so that corrosion prevention measures are required for the rotor.

One example employs a configuration of sealing the permanent magnet and the rotor core by using a rotor can in a cylindrical shape made of a material equivalent to the material of the main shaft, for example, a stainless steel material and rotor can lateral plates on respective end sides of the rotor can (as described in Patent Document 1). Another example employs a configuration of a resin molded rotor to integrate and seal the main shaft and the rotor provided with the permanent magnet by using a resin mold (as described in Patent Document 2). In a canned motor of Patent Document 2, one or a plurality of grooves are formed in an outer circumference of the main shaft on respective end sides of the rotor. In a cooling process of a molten resin used to cover the rotor and the main shaft, a resin is made to closely adhere to a side face of the groove in the main shaft by taking advantage of a shrinking force of the resin due to a difference between a linear expansion coefficient of the resin and a linear expansion coefficient of a material used to form the rotor, with a view to improving the sealing properties (gas tightness and liquid tightness) at low cost.

Yet another example employs a configuration of sealing an adhesive by a resin impregnation agent in a rotor provided with a rotor core formed by adhesion of a plurality of steel plates by means of the adhesive, a permanent magnet placed in the rotor core, and lateral plates fixed by the adhesive on respective ends in an axial direction of the rotor core, in order to suppress water content and/or a corrosive gas from entering the steel plates (as described in Patent Document 3). In the configuration of Patent Document 3, the permanent magnet is further processed by non-pinhole coating and is made to be shorter than the rotor core, and the adhesive is filled between the permanent magnet and the respective lateral plates, with a view to improving the corrosion resistance of the permanent magnet.

RELATED ART DOCUMENT

Patent Document

Patent Document 1: Japanese Unexamined Patent Publication No. H07-312852
Patent Document 2: Japanese Patent No. 5602615
Patent Document 3: Japanese Patent No. 6298237
Patent Document 4: Japanese Patent No. 6461733

SUMMARY OF INVENTION

Technical Problem

The configuration of Patent Document 1 has heat loss (can loss) by eddy current caused by a rotating magnetic field of the rotor and has high cost due to a metal welding structure to weld between the rotor can and the rotor can lateral plates and between the rotor can and the main shaft. In the configuration of Patent Document 2, the resin used to cover the rotor and the main shaft is unlikely to sufficiently follow thermal deformation and to maintain the sealing property. There is accordingly still a room for further improvement in the sealing structure. The configuration of Patent Document 3 has poor assembling performance and has another problem of high cost for applying non-pinhole coating. The improvement of the sealing property of the rotor in such a canned motor is also demanded in a canned motor used as a driving source of a fan scrubber described in Patent Document 4.

One object of the present disclosure is to solve at least part of the problems described above. One object of the present disclosure is to further enhance the sealing property of a motor rotor.

Solution to Problem

According to one aspect of the present disclosure, there is provided a resin molded rotor, comprising: a rotor configured to hold a magnet; a main shaft provided with the rotor mounted thereto and configured to transmit power to outside; and a resin mold configured to integrally cover the rotor and part of the main shaft on respective sides in an axial direction of the rotor, wherein an O-ring is placed between the resin mold and the main shaft to seal between the resin mold and the main shaft.

DESCRIPTION OF EMBODIMENTS

The following describes embodiments of the present disclosure with reference to attached drawings. In the attached drawings, identical or similar components are expressed by identical or similar reference signs. In the explanation of the respective embodiments, overlapping description with regard to the identical or similar components may be omitted. Characteristics and features described in each of the embodiments are applicable to the other embodiments so far as they are not incompatible with each other.

First Embodiment

Figure 1:
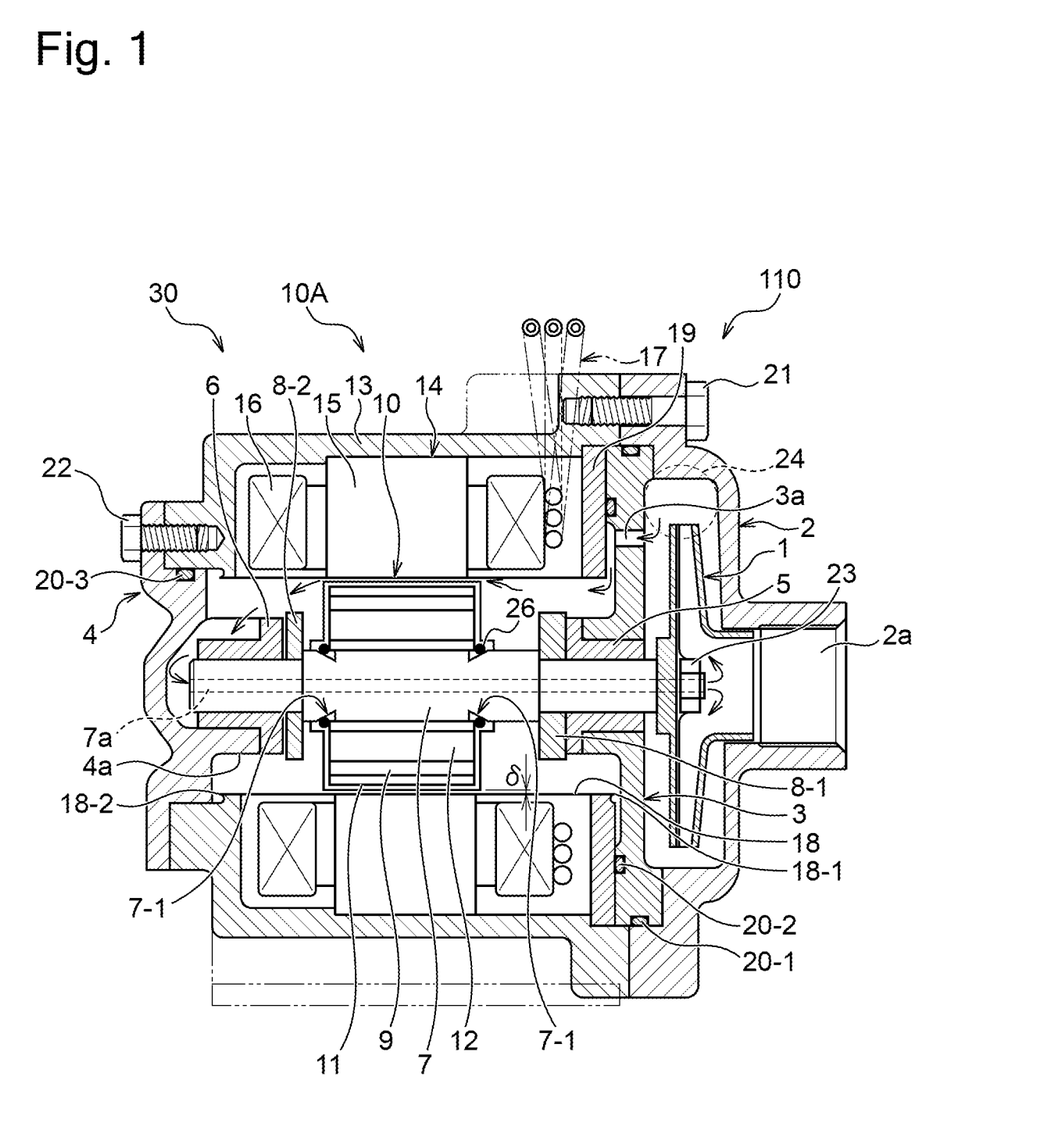
FIG. 1 is a sectional view illustrating the schematic structure of a canned motor pump that is provided with a resin molded rotor according to a first embodiment.

FIG. 1 is a sectional view illustrating the schematic structure of a canned motor pump 110 that is provided with a resin molded rotor 10A according to a first embodiment. As illustrated, the canned motor pump 110 is configured to include a canned motor 30 provided with a stator 14 fixed to an inner circumferential surface of a motor frame 13 by shrink fit or the like and with the resin molded rotor 10A placed rotatably in the stator 14; and an impeller 1 mounted to and fixed to a leading end part of a main shaft 7 of the canned motor 30. The stator 14 is configured to include a stator core 15 configured by stacking magnetic plate materials with holes in a circular shape formed at respective centers thereof to form inside thereof a through-space having an inner circumference in an approximately cylindrical shape; and an electric conductor (coil) wound on the stator core 15. A stator can 18 in an approximately cylindrical shape made of stainless steel or the like is fixed to the inner circumferential surface of the stator core 15. The stator can 18 separates a rotor 10 (the resin molded rotor 10A) from the stator 14. More specifically, the stator can 18 divides the inside of the motor frame 13 into a rotor chamber where the rotor 10 (the resin molded rotor 10A) is placed and a stator chamber where the stator 14 is placed. The resin molded rotor 10A includes the rotor 10, the main shaft 7 which the rotor 10 is mounted to, and a resin mold 11 provided to integrally cover the rotor 10 and part of the main shaft 7. The rotor 10 includes a rotor core 12 and a permanent magnet 9 embedded inside of the rotor core 12. The resin mold 11 covers an outer circumferential surface and end faces of the rotor core 12 on respective shaft end sides to grooves 7-1 on a load side and on an opposite load side that are portions where grooves are formed in outer circumferences of respective shaft end sides of the main shaft 7 outside of a mounting range of the rotor core 12. There is a uniform clearance 6 between the inner circumference of the stator can 18 and the surface of the resin mold 11 formed on the outer circumference of the rotor core 12.

This embodiment illustrates an application example of an IPM (Internal Permanent Magnet) motor having the permanent magnet 9 placed inside of the rotor 10. Other application examples include an SPM (Surface Permanent Magnet) motor having a permanent magnet placed on the surface of the rotor 10 and a motor having an electromagnet placed in a rotor.

An end 18-2 on the opposite load side (on a left side in FIG. 1) of the stator can 18 is brought into contact with the motor frame 13 and is fixed to the motor frame 13 by welding respective abutting portions thereof. An end 18-1 on the load side (on a right side in FIG. 1) of the stator can 18 is inserted into a through hole of a stator can lateral plate 19 on the load side, where the through hole is formed at the center of a disk-shaped plate material provided as the stator can lateral plate 19, and is fixed to the stator can lateral plate 19 on the load side by welding respective abutting portions thereof from an end face side.

The motor frame 13 is formed in a bottomed cylindrical shape having an opposite load side end closed by a bearing bracket 4 on the opposite load side and an open load side end. The bearing bracket 4 is provided with a cylindrical protrusion 4a that is protruded in a cylindrical shape inward along an axial direction of the main shaft 7, and the cylindrical protrusion 4a is provided with a bearing 6 on the opposite load side that supports the main shaft 7 to be freely rotatable. A cut is formed in part of the cylindrical protrusion 4a to allow for a flow of a pump handling liquid. A sealing member 20-3 configured by, for example, an O-ring made of rubber or the like, is placed between the motor frame 13 and the bearing bracket 4 to seal between the motor frame 13 and the bearing bracket 4 and prevent leakage of the pump handling liquid to outside. The bearing bracket 4 is fixed to the motor frame 13 by tightening a bolt 22. Furthermore, a thrust disk 8-2 on the opposite load side is fixed to the main shaft 7 and is placed between the bearing 6 and the rotor 10.

A bearing bracket 3 on the load side is, on the other hand, placed at the load side end of the motor frame 13. A bearing 5 on the load side is placed on an output side of the main shaft 7 (on the right side in FIG. 1) to rotatably support the main shaft 7 and is fixed to this bearing bracket 3. Furthermore, a thrust disk 8-1 on the load side is fixed to the main shaft 7 and is placed between the bearing 5 and the rotor 10.

A space is formed between the motor frame 13 and the bearing bracket 3. The stator can lateral plate 19 is configured to have an outer circumferential part placed between and fixed by the motor frame 13 and the bearing bracket 3 by inserting the outer circumferential part of the stator can lateral plate 19 into this space and tightening a bolt 21 for fixing a pump casing 2. Furthermore, the bearing bracket 3 is configured to have an outer circumferential part placed between and fixed by the motor frame 13 and the pump casing 2.

A sealing member 20-2 configured by, for example, an O-ring made of rubber or the like, is placed between the bearing bracket 3 and the stator can lateral plate 19 to seal between the bearing bracket 3 and the stator can lateral plate 19. A sealing member 20-1 configured by, for example, an O-ring made of rubber or the like, is placed between the bearing bracket 3 and the pump casing 2 to seal between the bearing bracket 3 and the pump casing 2. The configuration of respectively placing the sealing member 20-2 between the stator can lateral plate 19 and the bearing bracket 3 and placing the sealing member 20-1 between the bearing bracket 3 and the pump casing 2 prevents leakage of the pump handling liquid to outside.

Figure 2:
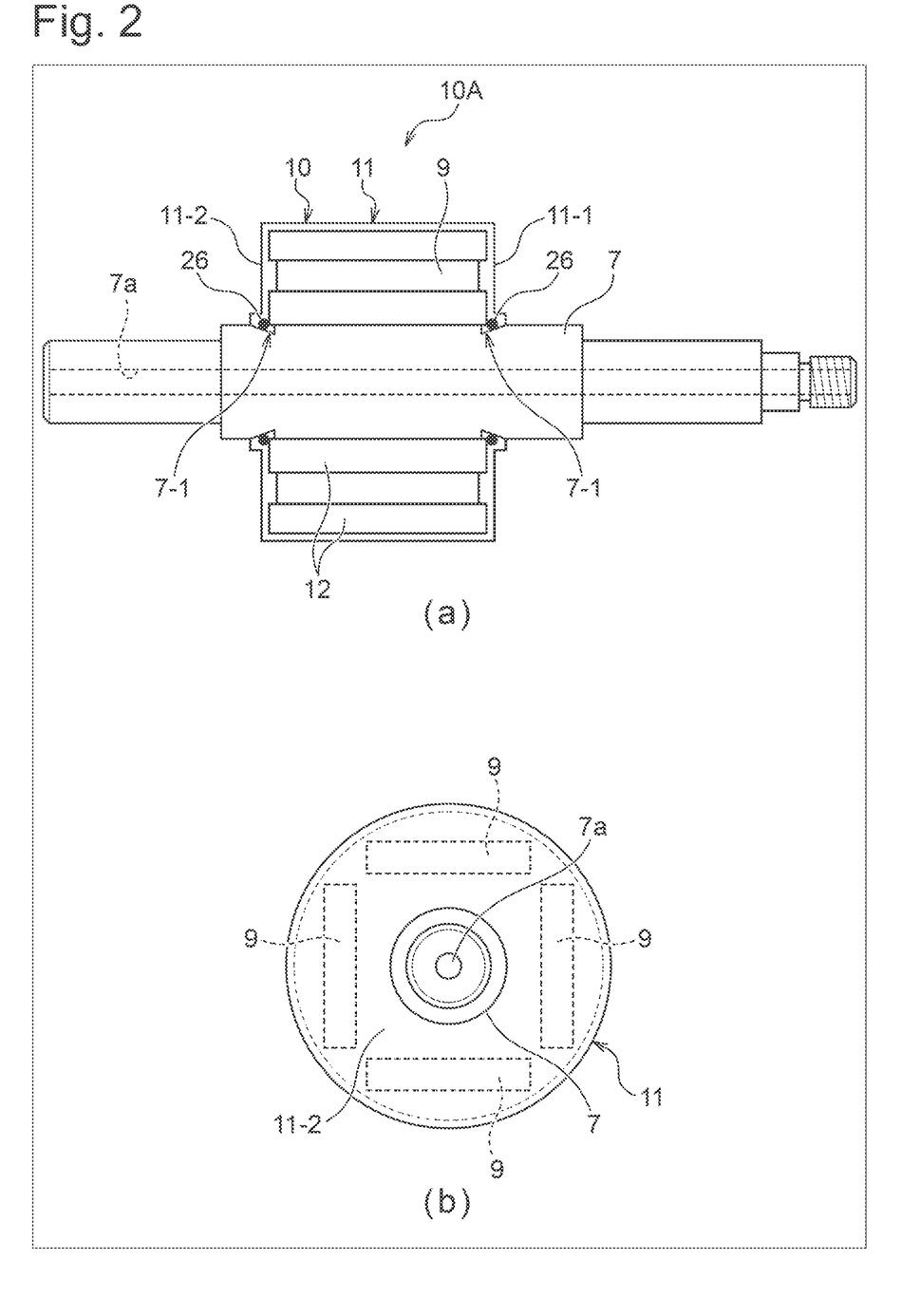
FIG. 2 is diagrams illustrating the schematic structure of the resin molded rotor.
Figure 3:
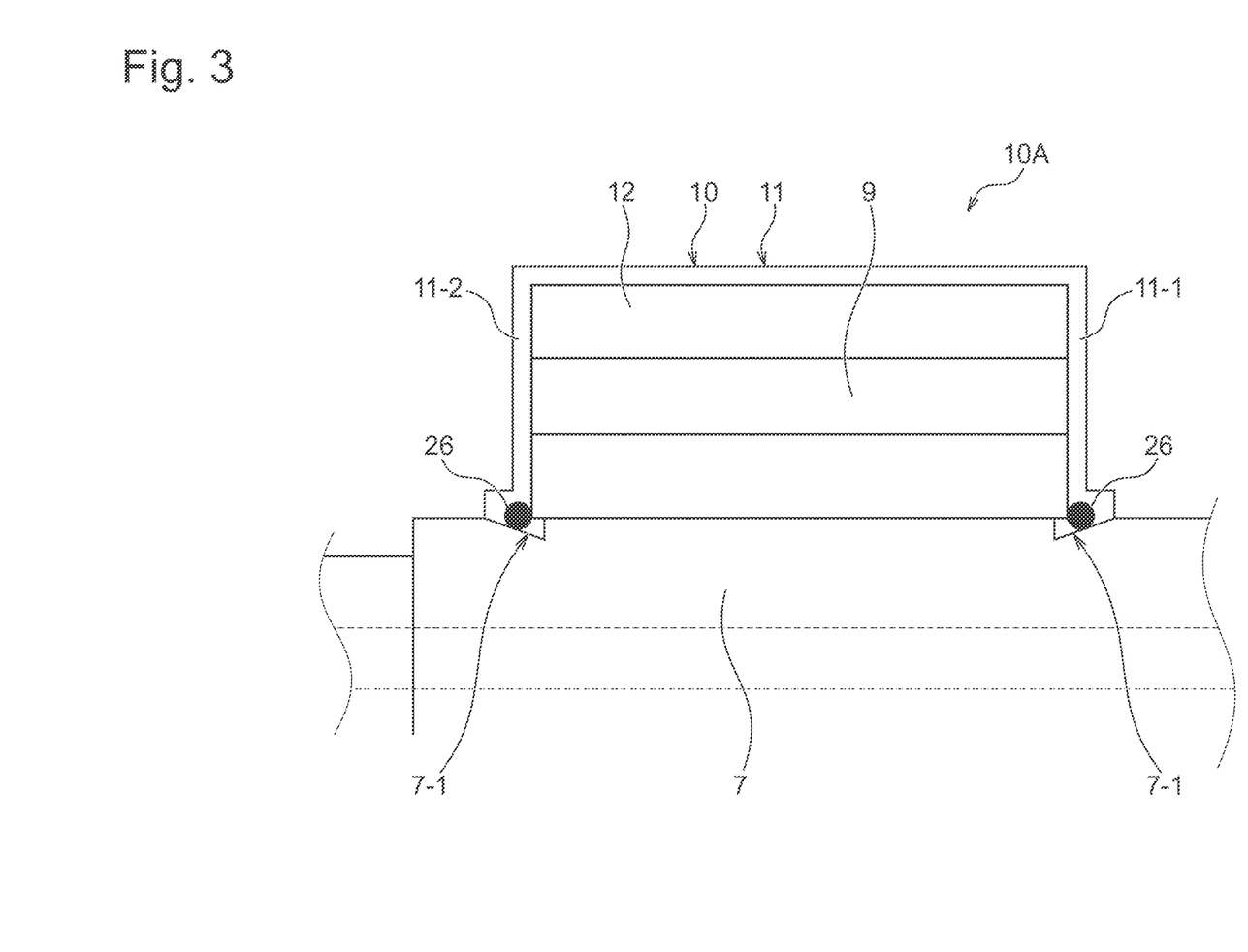
FIG. 3 is a diagram illustrating an example of the partial schematic structure of the resin molded rotor.

FIG. 2 is diagrams illustrating the general configuration of the resin molded rotor 10A with the resin mold 11 formed therein. FIG. 2(a) is a sectional front view, and FIG. 2(b) is a left side view. FIG. 3 is a partial enlarged sectional view illustrating the resin molded rotor 10A. The resin molded rotor 10A is configured by covering the outer circumferential surface of the rotor 10 having the rotor core 12 with the permanent magnet 9 embedded therein and regions up to the grooves 7-1 provided in the outer circumferences of the respective shaft end sides of the main shaft 7 outside of the mounting range of the rotor 10, with the resin mold 11.

A material having high corrosion resistance (for example, a PPS material or a fluororesin PFA) is used for the resin mold 11. Setting the thickness of a resin film of the resin mold 11 corresponding to a rotor can to about 0.5 mm to 1.0 mm is expected to improve the mechanical strength, the corrosion resistance and the liquid resistance. Using an excessive amount of the material is likely to cause problems from different views, for example, reduction of the economic performance and the increased likelihood in shape change caused by, for example, "sink" of the material. It is accordingly required to set the thickness of the resin film, such as to prevent the occurrence of such problems.

It is also suitable to set the thicknesses of respective shaft end side portions 11-1 and 11-2 of the resin mold 11 to about 2 to 3 mm by taking into account the positioning accuracy in the axial direction. These thicknesses are determined by taking into account, for example, the dimensional tolerance of the positioning accuracy in the axial direction of the rotor core 12 in the case of mounting the rotor core 12 to the main shaft 7, in addition to the specification dimension with regard to the thickness of the resin film of the resin mold 11 corresponding to the rotor can in relation to the mechanical strength, the corrosion resistance and the liquid resistance.

The respective grooves 7-1 are annular grooves provided to go round the outer circumferential surface of the main shaft 7 in a circular direction at positions coming into contact with the load side end and the opposite load side end (end faces) of the rotor 10 (positions where the rotor 10 overlaps with the grooves 7-1). The grooves 7-1 are formed to have any sectional shape having such dimensions and shape as to hold an O-ring 26, for example, a triangular shape like a right triangle shown in FIGS. 1-3, a rectangular shape (shown in FIG. 8(a)), a wedge shape (shown in FIG. 8(b)) or a beveled groove shape (shown in FIG. 8(c)).

According to the embodiment, the O-ring 26 is placed in each of the grooves 7-1. The O-ring 26 is made of rubber and is configured to favorably and closely adhere to the rotor 10, the main shaft 7 and the resin mold 11 and to have such elasticity as to deform favorably following thermal deformations of these members. The O-ring 26 is preferably made of rubber having heat resistance such as fluororubber (for example, FKM or FFKM) by taking into account the heat resistance in a resin molding process of molding with PPS or the like at high temperature. The O-ring 26 is mounted in each of the grooves 7-1 in an annular shape and is subsequently molded integrally with the rotor 10 and the main shaft 7 by using the resin mold 11 to closely adhere to and to be fixed to the rotor 10, the main shaft 7 and the resin mold 11. The O-ring 26 is placed in each of the grooves 7-1. This configuration suppresses/prevents the position of the O-ring 26 from being displaced by the pressure of the resin in the course of resin molding.

According to the embodiment, the O-rings 26 are placed in the respective grooves 7-1 to closely adhere to the respective shaft end-side end faces of the rotor 10, the main shaft 7 and the resin mold 11. This configuration enhances the adhesion between the resin mold 11 and the main shaft 7 and also enhances the sealing property between the resin mold 11 and the main shaft 7 and the sealing property between the resin mold 11 and the rotor 10. As a result, this configuration more reliably suppresses or prevents the rotor 10 from being exposed to or coming into contact with the pump handling liquid and/or a corrosive gas. Furthermore, according to the embodiment, the grooves 7-1 and the O-rings 26 are placed at the positions coming into contact with the respective shaft end-side end faces of the rotor 10. This configuration reduces the distance of the resin mold 11 in the axial direction and enhances the adhesion between the resin mold 11 and the main shaft 7. Moreover, the configuration that the grooves 7-1 and the O-rings 26 are placed at the positions coming into contact with the respective shaft end-side end faces of the rotor 10 reduces the required length in the axial direction of the resin mold 11 and saves the amount of the molding agent (for example, a resin) used.

The resin molded rotor 10A may be manufactured by, for example, a manufacturing process described below:

(a) inserting the rotor core 12 into the main shaft 7 with the grooves 7-1 formed thereon;

(b) placing the O-rings 26 in the grooves 7-1 of the main shaft 7;

(c) guiding the rotor core 12 by the main shaft 7 and positioning the rotor core 12 in an injection molding die;

(d) mounting the permanent magnet 9 to the rotor core 12 (the permanent magnet 9 may be mounted to the rotor core 12 prior to insertion of the rotor core 12 into the main shaft 7);

(e) molding the rotor core 12, the permanent magnet 9 and the O-ring 26 with a resin material (injection molding) not to cause exposure of the rotor core 12, the permanent magnet 9 or the O-ring 26. This obtains the resin molded rotor 10A having the rotor 10, the main shaft 7 and the resin mold 11.

(f) inserting the obtained resin molded rotor 10A into a magnetizing yoke to be magnetized.

The resin mold 11 formed by injecting a molten resin material has a larger linear expansion coefficient than those of the rotor core 12 and the main shaft 7 made of metal materials and is shrunk toward an outer diameter side of the rotor core 12 relative to the rotor core 12 in a natural cooling process after the injection molding. Accordingly, a shrinking force toward the rotor side and toward the outer diameter side is likely to be applied to a region of the resin mold 11 that closely adheres to the main shaft 7 and to decrease the sealing property between the resin mold 11 and the main shaft 7. In the resin molded rotor 10A of this embodiment, the resin mold 11 injection-molded in the die has the larger linear expansion coefficient than those of the rotor core 12 and the main shaft 7 made of the metal materials. Even when the resin mold 11 is shrunk in the natural cooling process after injection, the O-rings 26 are deformed following the shrinkage of the resin mold 11 such as not to make a clearance between the resin mold 11 and the main shaft 7. This maintains the sealing property between the resin mold 11 and the main shaft 7. Furthermore, the O-rings 26 are portions protruded from the outer circumferential surface of the main shaft 7. This configuration also has the advantageous effect of utilizing shrinkage of the resin mold 11 to cause the resin mold 11 to closely adhere to the O-rings 26.

According to the embodiment, the configuration of not using a metal material such as stainless steel material as the rotor can material but of resin-molding the canned motor with a resin material having high corrosion resistance achieves the original purpose or more specifically protection of the rotor core and the magnet material from corrosion. This configuration is not only inexpensive but prevents generation of eddy current, which is generated in a can made of a metal material during operation, thereby providing an efficient canned motor. In the resin molded rotor 10A of the embodiment, the sealing structure of the rotor 10 is implemented by the resin mold 11 and the O-rings 26. This has the advantageous effects of the simple manufacturing process and the high assembling performance.

The following describes the operations of the canned motor pump 110 shown in FIG. 1. A rotating magnetic field generated by connecting a three-phase AC power source with an outlet line 17 and supplying three-phase alternating current to an electric conductor (coil) 16 of the stator 14 is applied to the rotor 10 to rotate the impeller 1 fixed to the main shaft 7 of the rotor 10. The pump handling liquid sucked in through a suction port 2a of the pump casing 2 by the rotation of the impeller 1 flows into the pump casing 2, passes through a discharge volute 24, and is discharged from a discharge port (not shown), while part of the pump handling liquid passes through a hole 3a provided in the bearing bracket 3 on the load side and flows into a rotor chamber surrounded by the stator can 18. The pump handling liquid flowing into the rotor chamber passes through the clearance δ between the resin mold 11 and the stator can 18, flows into the cylindrical protrusion 4a in a bottomed cylindrical shape of the bearing bracket 4 on the opposite load side, passes through a through hole 7a provided at the center of the main shaft 7, flows into the impeller 1, and joins up with the sucked pump handling liquid.

As described above, the pump handling liquid flows into the rotor chamber surrounded by the stator can 18 and flows through the clearance δ between the resin molded rotor 10A and the stator can 18. The embodiment is configured to integrally seal the rotor 10 and the main shaft 7 with the resin mold 11, to provide the grooves 7-1 in the vicinity of interfaces between the main shaft 7 and the resin mold 11 and to place the O-rings 26 in the grooves 7-1 to enhance the sealing property at the interfaces between the resin mold 11 and the main shaft 7. As a result, this configuration maintains the interfaces between the resin mold 11 and the main shaft 7 in a good sealing condition and suppresses or prevents the rotor 10 from being exposed to or coming into contact with the pump handling liquid. This extends the life of the resin mold rotor 10A.

Second Embodiment

Figure 4:
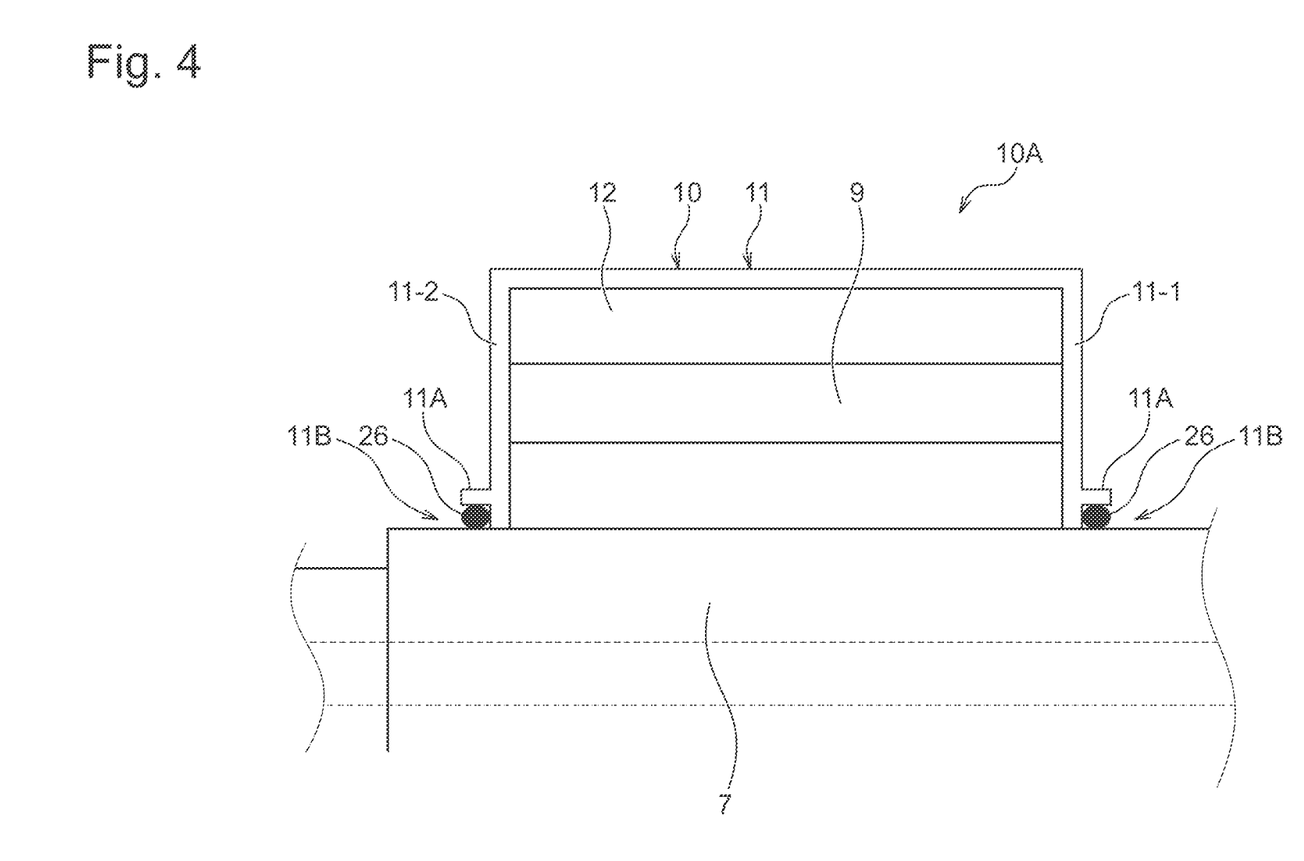
FIG. 4 is a diagram illustrating an example of the partial schematic structure of a resin molded rotor according to a second embodiment.

FIG. 4 is a diagram illustrating an example of the partial schematic structure of a resin molded rotor according to a second embodiment. This embodiment has a resin molded rotor 10A of a different configuration from that of the embodiment described above but otherwise has a similar configuration to that of the embodiment described above. The following describes differences from the above embodiment with omitting description with regard to the similar configuration to that of the above embodiment.

According to this embodiment, O-rings 26 are mounted after formation of a resin mold 11 for a rotor 10 and a main shaft 7. In the resin molded rotor 10A of this embodiment, the resin mold 11 is provided with annular protrusions 11A on the respective shaft end sides of a rotor core 12, i.e., on the load side and on the opposite load side, and O-ring grooves 11B are formed between the annular protrusions 11A and an outer circumferential surface of the main shaft 7. The annular protrusions 11A are provided to be protruded from the respective shaft end side portions 11-1 and 11-2 of the resin mold 11 outward in the axial direction relative to the rotor 10 and to go round the main shaft 7 in the circumferential direction. The annular protrusions 11A of the resin mold 11 are formed by injection molding of a resin into a die having portions in shapes corresponding to the protrusions. For example, the rotor 10 mounted to the main shaft 7 is provided, and the resin mold 11 is formed by injection molding to cover the rotor 10 and the main shaft 7 and to have the annular protrusions 11A. The O-rings 26 are subsequently fit in between the annular protrusions 11A and the main shaft 7 to be placed, mounted, and fixed between the annular protrusions 11A and the main shaft 7.

According to the embodiment, the O-ring 26 is placed to seal the interface between the resin mold 11 and the main shaft 7. This suppress the interface between the resin mold 11 and the main shaft from being exposed to or coming into contact with the pump handling liquid and thereby suppresses the rotor core 12 from being exposed to or coming into contact with the pump handling liquid via the interface between the resin mold 11 and the main shaft 7. Moreover, the configuration of placing the O-ring 26 after formation of the resin mold 11 prevents a positional shift of the O-ring 26 in the injection molding process of the resin mold and prevents the O-ring 26 from being affected by the heat in the injection molding process.

The foregoing describes the example where the annular protrusions 11A are provided continuously along the whole circumference. The annular protrusions 11A are, however, not necessarily provided along the whole circumference but may be provided discretely in the circumferential direction, as long as the annular protrusions 11A serve to hold the O-rings 26 such as to seal interfaces between the resin mold 11 and the main shaft 7.

Figure 5:
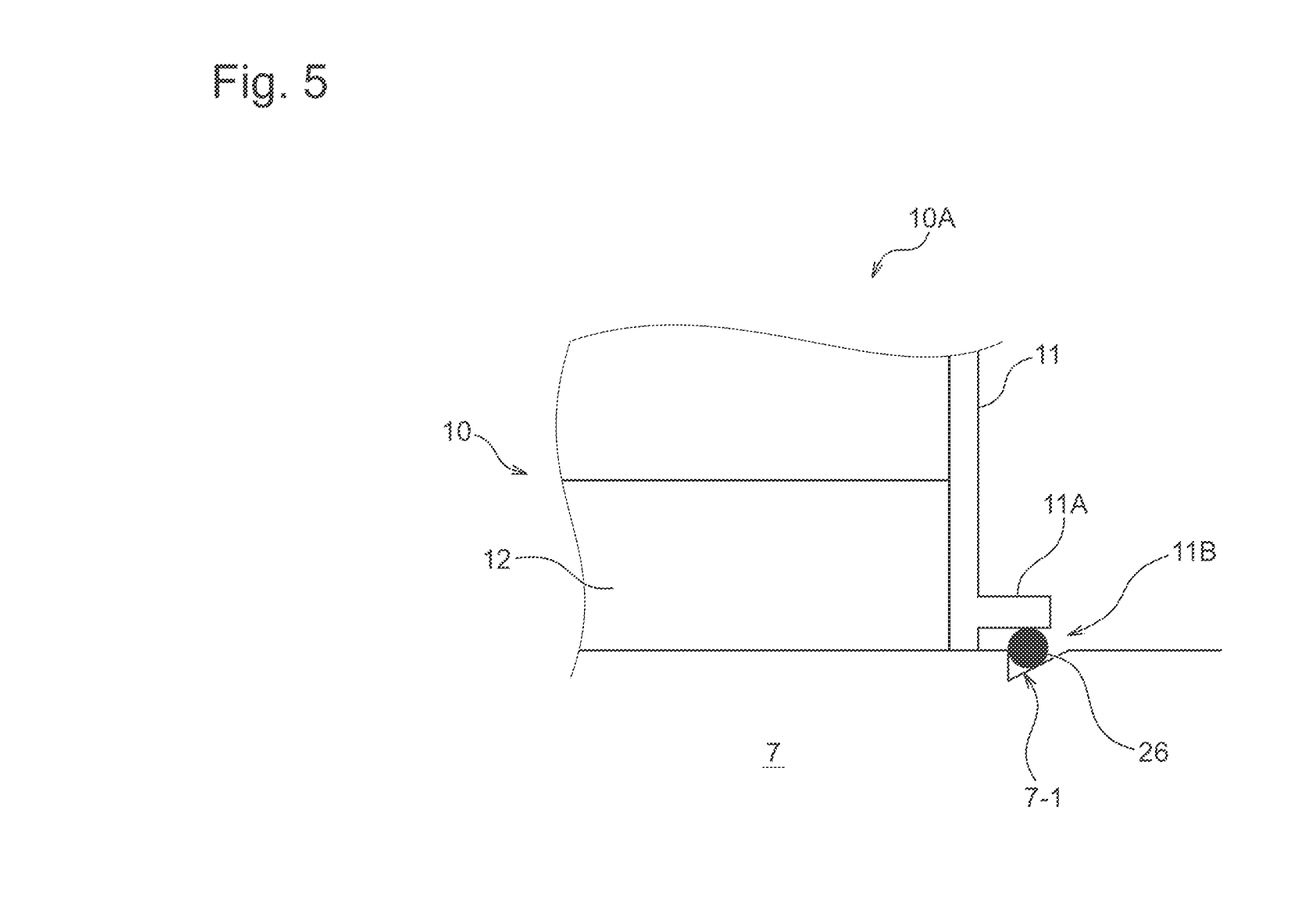
FIG. 5 is a diagram illustrating an example of the partial schematic structure of a resin molded rotor according to a modification of the second embodiment.

FIG. 5 is a diagram illustrating an example of the partial schematic structure of a resin molded rotor according to a modification of the second embodiment. As illustrated in FIG. 5, grooves 7-1 (shown in FIGS. 1 to 3) may be provided in the outer circumferential surface of the main shaft 7 corresponding to the annular protrusions 11A, and O-rings 26 may be placed between the grooves 7-1 and the annular protrusions 11A to be fixed in O-ring grooves 11B. In this configuration, the distance between the annular protrusion 11A and the outer circumference of the main shaft 7 (or the inner surface of the groove 7-1), the depth and/or the shape of the groove 7-1 are set such as to cause the O-ring 26 to sufficiently seal between the main shaft 7 and the annular protrusion 11A. In this configuration, the groove 7-1 in the outer circumferential surface of the main shaft 7 more reliably suppresses the O-ring 26 from being displaced in the axial direction during the motor operation.

Figure 6:
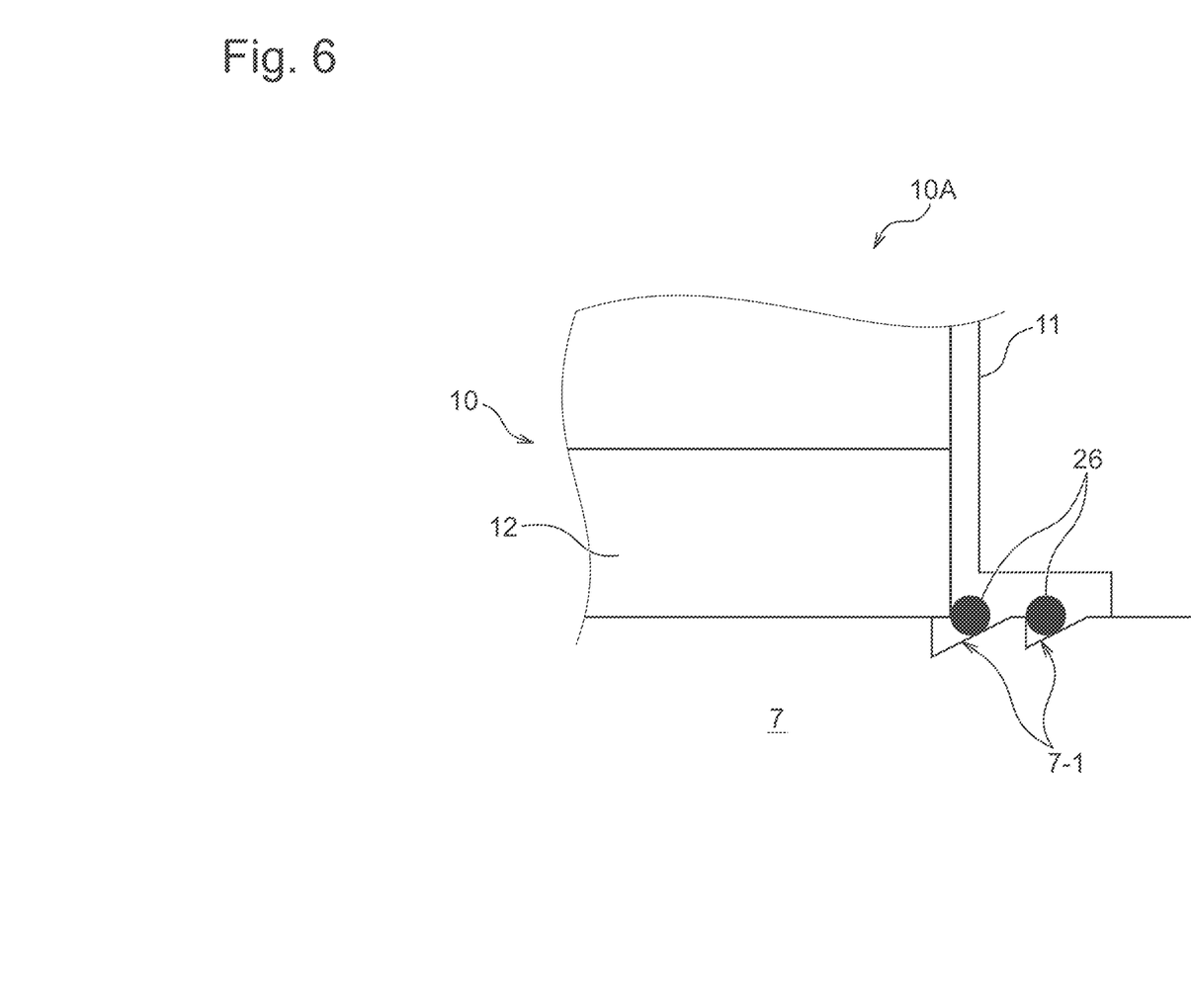
FIG. 6 is a diagram illustrating an example of the partial schematic structure of a resin molded rotor according to another embodiment.

Other Embodiments (1) In the above embodiment, one O-ring is provided on each side in the axial direction of the rotor 10. Two or more O-rings may, however, be provided on at least one side of the rotor 10. FIG. 6 is a diagram illustrating an example of the partial schematic structure of a resin molded rotor 10A according to another embodiment. In FIG. 6, a plurality of grooves 7-1 are provided in the outer circumferential surface of the main shaft 7 on at least one side out of the respective shaft end sides of the rotor 10, and O-rings 26 are placed in the respective grooves 7-1. This configuration enables the interfaces between the resin mold 11 and the main shaft 7 to be sealed by the plurality of O-rings 26 and further enhances the sealing property.

Figure 7:
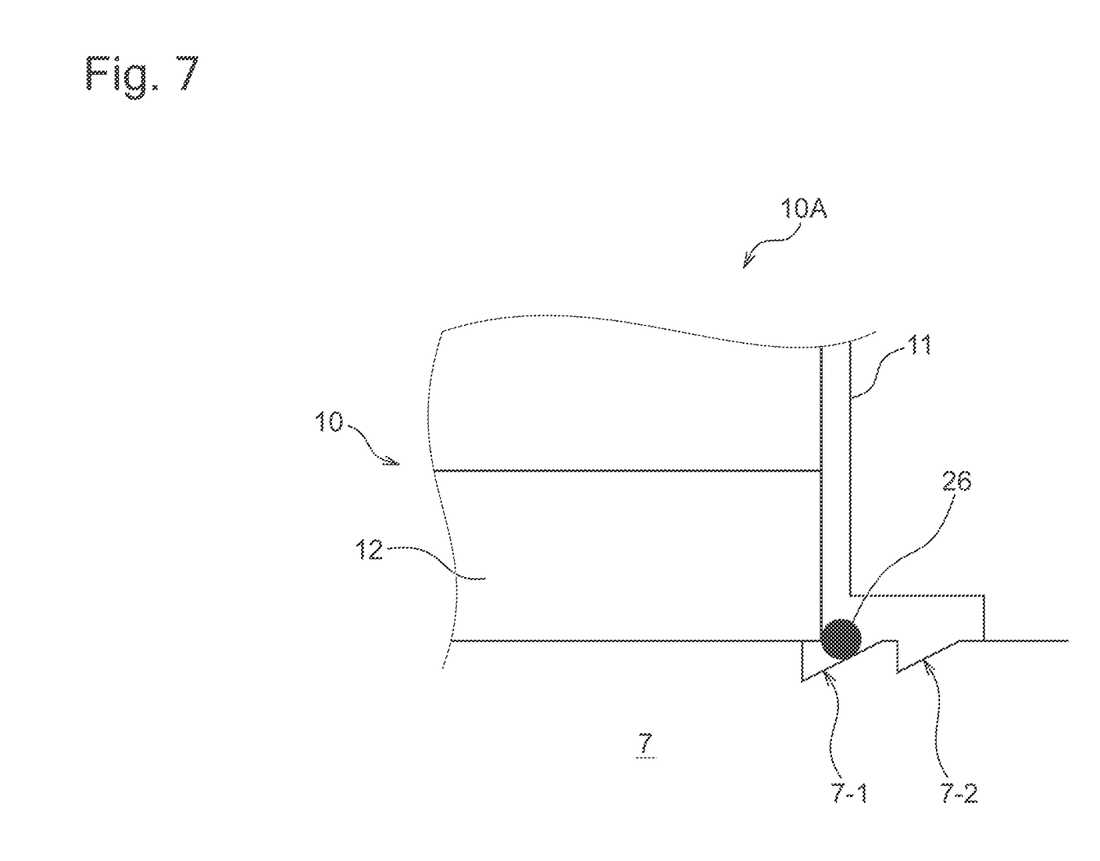
FIG. 7 is a diagram illustrating an example of the partial schematic structure of a resin molded rotor according to another embodiment.
Figure 8:
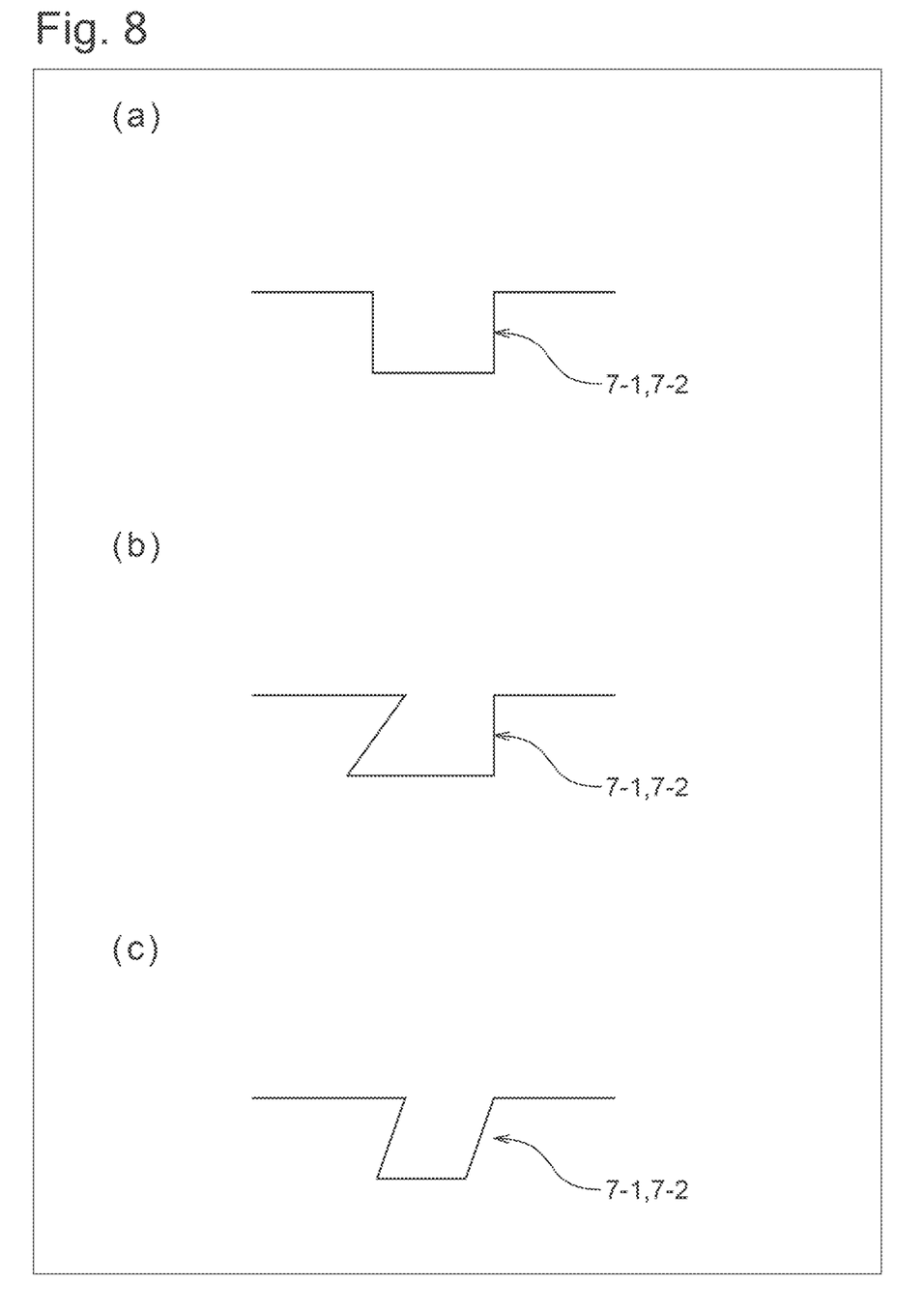
FIG. 8 is diagrams illustrating examples of sectional shape of a groove in an outer circumferential surface of a main shaft.

(2) No O-ring may be placed in at least one groove out of a plurality of grooves, and the resin mold 11 may enter this at least one groove (as shown in FIG. 7). FIG. 7 is a diagram illustrating an example of the partial schematic structure of a resin molded rotor 10A according to another embodiment. In FIG. 7, a groove 7-1 represents a groove where an O-ring 26 is placed, whereas a groove 7-2 represents a groove where no O-ring 26 is placed. In this illustrated example, the grooves 7-1 and 7-2 are provided in the outer circumferential surface of the main shaft 7, and the O-ring 26 is placed in the groove 7-1 but is not placed in the groove 7-2. This configuration enables the resin mold 11 to closely adhere to a side face of the groove 7-2 by taking advantage of a difference between a linear expansion coefficient of the resin mold 11 and a linear expansion coefficient of a material used to form the rotor 10. This configuration further enhances the sealing property between the main shaft 7 and the resin mold 11 by combining the sealing by means of the O-ring 26 placed in the groove 7-1 with the sealing by means of adhesion of the resin into the groove 7-2. The sectional shape of the groove 7-2 where no O-ring 26 is placed is preferably a shape that enhances the adhesion of the resin mold 11 and may be any of various shapes including those illustrated in FIGS. 1 to 3 and FIG. 8. The number of the groove 7-1 where the O-ring 26 is placed and the number of the groove 7-2 where no O-ring 26 is placed may be one or plural. The groove 7-2 where no O-ring 26 is placed but the resin mold 11 enters may be provided on a side nearer to the rotor 10 and/or on a side farther away from the rotor 10 than the groove 7-1 where the O-ring 26 is placed.

(3) Different O-ring placing structures described above may be employed for at least one O-ring and for another or other O-rings. An identical O-ring placing structure may be employed for the respective shaft end sides of the rotor 10, or different O-ring placing structures may be employed for the respective shaft end sides of the rotor 10. An identical O-ring placing structure may be employed for all two or more O-rings on at least one side of the rotor 10, or different O-ring placing structures may be employed for at least part of two or more O-rings on at least one side in the axial direction of the rotor 10. These O-ring placing structures may be employed in combination with grooves where no O-rings are placed.

(4) The foregoing describes the canned motor pump that handles the liquid as one example. The canned motor provided with the resin molded rotor 10A described above may, however, be applied to a canned motor pump that handles a liquid and/or a gas.

Third Embodiment

Figure 9:
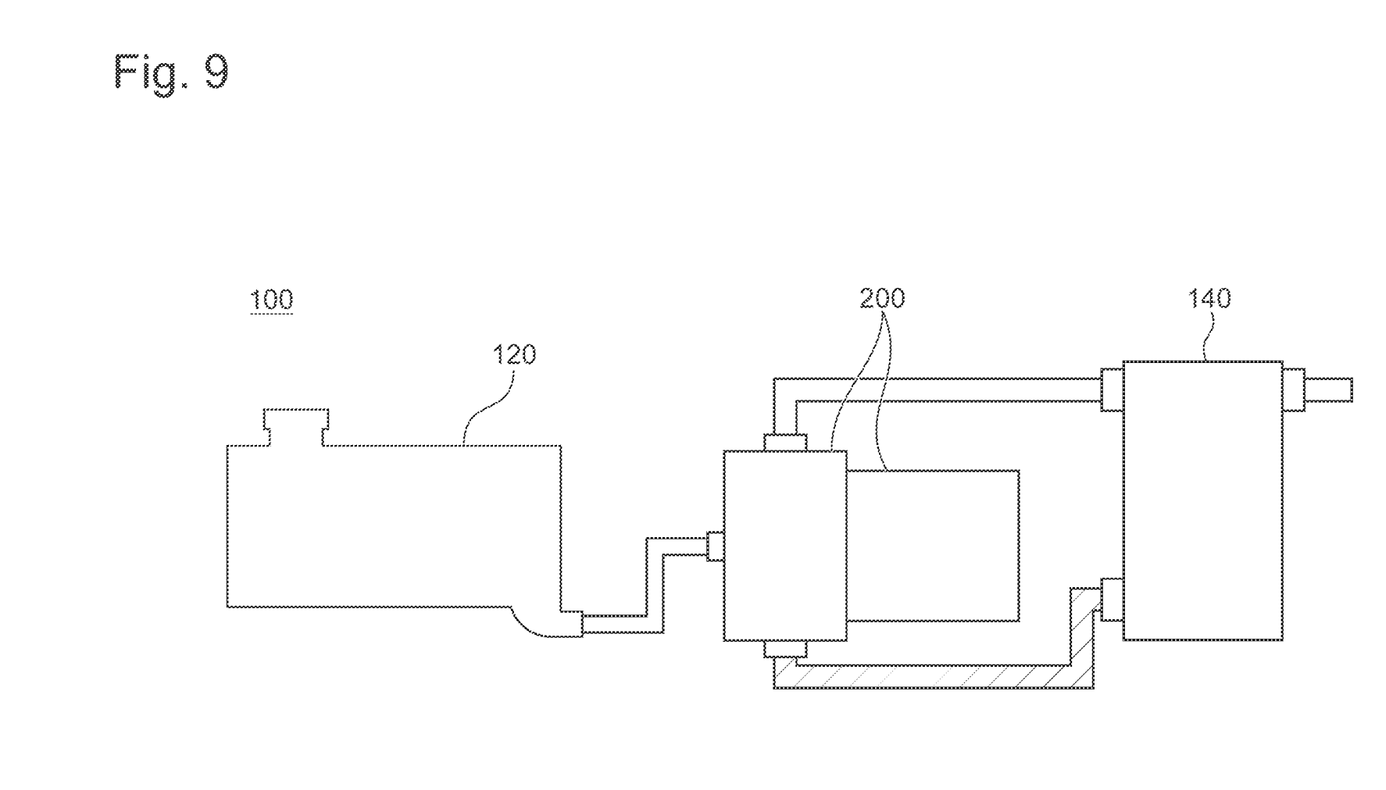
FIG. 9 is a diagram illustrating a configuration example of a vacuum pump apparatus.
Figure 10:
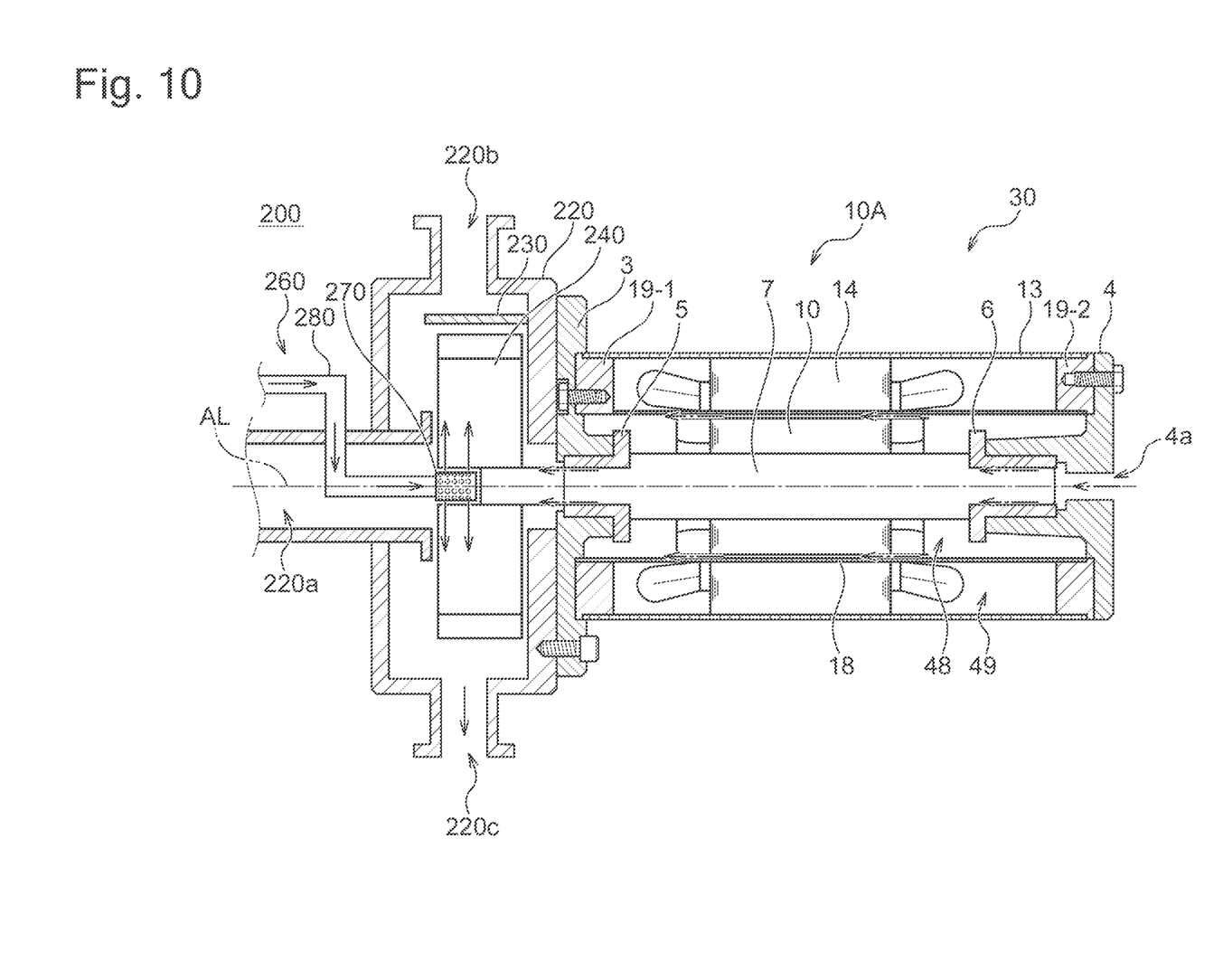
FIG. 10 is a diagram illustrating a configuration example of a fan scrubber.

FIG. 9 is a diagram illustrating the schematic configuration of a vacuum pump apparatus according to this embodiment. FIG. 10 is a diagram illustrating the schematic configuration of a fan scrubber. The vacuum pump apparatus of this embodiment may be used as one of manufacturing equipment for semiconductors, liquid crystals, solar panels, LEDs or the like. This embodiment describes an example where the resin molded rotor 10A and/or the canned motor 30 described above is applied to the vacuum pump apparatus.

The vacuum pump apparatus 100 of this embodiment includes a vacuum pump 120 connected with a non-illustrated processing chamber to suck a gas from the processing chamber (evacuate the processing chamber), a fan scrubber 200 connected with and subsequent to the vacuum pump 120, and a detoxification device 140 connected with the fan scrubber 200. One usable example of the vacuum pump 120 is a dry vacuum pump. The vacuum pump 120 may be, for example, a canned motor pump provided with the canned motor 30 including the resin molded rotor 10A described above.

The fan scrubber 200 is provided to remove foreign substances such as solidified substances (for example, reaction byproducts) included in the gas from the vacuum pump 120. Furthermore, the detoxification device 140 is provided to detoxify the gas from the vacuum pump 120. The detoxification device 140 used may be one or plural devices selected among a combustion type, a dry type, a wet type, a heater type, a fluorine fixation type, a catalyst type, a plasma type, a dilution unit type (a blower, addition of $N_2$, and addition of the air), and the like.

In the vacuum pump apparatus 100 of the embodiment, the gas sucked in vacuum by the vacuum pump 120 is first guided to the fan scrubber 200 to pass through the fan scrubber 200 and is then guided to the detoxification device 140. This configuration suppresses foreign substances such as solidified substances from being introduced into the detoxification device 140 and thereby suppresses clogging of the detoxification device 140 or reduction in the processing efficiency of the detoxification device 140. The liquid (waste liquid) used to trap the foreign substances in the fan scrubber 200 may be introduced into the detoxification device 140 to be reused in the detoxification device 140 as shown by a hatched part in FIG. 9.

(Fan Scrubber)

As shown in FIG. 10, the fan scrubber 200 includes a casing 220, a fan 240, a liquid discharge portion 260, and a canned motor 30. A main shaft 7 and a rotor 10 of the canned motor 30 are covered with a resin mold 11 (omitted from the illustration of FIG. 10) to have the similar configuration to that of the resin molded rotor 10A described above. The configuration of the fan scrubber 200 described herein is only one example, and the resin molded rotor and/or the canned motor described above may be employed for a motor of a fan scrubber of any configuration.

In the fan scrubber 200 illustrated herein, the main shaft 7 is linked with a fan 240 to provide a turning driving force to the fan 240. The canned motor 30 includes the main shaft 7, the rotor 10, a stator 14, a motor frame 13, and a stator can 18. Like the embodiment described above, the rotor 10, together with part of the main shaft 7, is covered with a resin mold (as shown by the resin mold 11 in FIG. 1). The rotor 10, the main shaft 7, and the resin mold 11 constitute the resin molded rotor 10A. In this canned motor 30, the rotor 10 and the main shaft 7 are rotated by electromagnetic induction through supply of electricity to the coil of the stator 14. In the fan scrubber 200 of this embodiment, the gas discharged from the vacuum pump 120 is taken in from a gas intake port 220a. The fan scrubber 200 removes foreign substances such as solidified substances included in the intake gas and supplies the processed gas from a gas discharge port 220b to the detoxification device 140.

The gas intake port 220a serving to guide the gas from the vacuum pump 120 to the fan 240 in the casing 220, the gas discharge port 220b serving to discharge the intake gas, and a liquid discharge outlet 220c serving to discharge a cleaning solution as waste liquid are formed in the casing 220. The fan 240 is placed inside of the casing 220. The fan 240 is mounted to the main shaft 7 of the canned motor 30 and is rotated by the power from the canned motor 30 to stir inside of the casing 220. In one example, the fan 240 may be configured to include two disk-shaped lateral plates opposed to each other and a plurality of blades fixed between these lateral plates.

The liquid discharge portion 260 is provided inside of the casing 220. The liquid discharge portion 260 serves to jet the cleaning solution inside of the casing 220. One available example of the cleaning solution is water. Using an alkaline liquid including a hydroxylation system (for example, sodium hydroxide or potassium hydroxide) liquid as the cleaning solution enhances the trapping efficiency of foreign substances and also suppresses corrosion of the casing 220, the fan 240 and the like. The cleaning solution may be determined, based on the foreign substances to be trapped.

The liquid discharge portion 260 includes a nozzle 270 having a plurality of jetting ports formed therein and a liquid supply pipe 280 arranged to communicate with the nozzle 270. In FIG. 10, a thick line arrow indicates a pathway of the cleaning solution discharged from the nozzle 270. The liquid discharge portion 260 supplies the cleaning solution to the nozzle 270 via the liquid supply pipe 280 by means of a non-illustrated pressure-feed mechanism and discharges the cleaning solution from the nozzle 270. According to this embodiment, the nozzle 270 is provided to be opposed to a rotating shaft of the fan 240 (the main shaft 7 of the canned motor 30) inside of the fan 240 to discharge the cleaning solution from a center part of the fan 240 to an outer periphery thereof.

A collision plate 230 is formed between the fan 240 and the gas discharge port 220b in the casing 220. The cleaning solution jetted from the nozzle 270 is splashed to an outer periphery of the nozzle 270 by the centrifugal force of the fan 240. Providing the collision plate 230 suppresses the cleaning solution from entering the gas discharge port 220b. The collision plate 230 may be formed not to cover only between the fan 240 and the gas discharge port 220 but to cover the approximately entire circumference of the fan 240.

In the canned motor 30, the stator can 18 serves to separate the rotor 10 from the stator 14. More specifically, the stator can 18 divides inside of the motor frame 13 into a rotor chamber 48 where the rotor 10 is placed and a stator chamber 49 where the stator 14 is placed. Like the clearance δ shown in FIG. 1, the stator can 18 is applied to an inner face of the stator 14 (or more specifically, a stator core thereof) with a slight gap formed between the stator 18 and the rotor 10.

Frame lateral plates (stator can lateral plates) 19-1 and 19-2 are fit between the motor frame 13 and the stator can 18 on respective ends of the canned motor 30 in an axial line AL direction. The motor frame 13, the stator can 18, and the frame lateral plates 19-1 and 19-2 work to seal the stator chamber 49. The frame lateral plates 19-1 and 19-2 are fastened to brackets 3 and 4 on respective end sides of the canned motor 30. The rotor chamber 48 is defined by the stator can 18 and the brackets 3 and 4. The bracket 3 on the load side is linked with the casing 220. The bracket 3 is provided with a through hole formed to cause the main shaft 7 to be inserted through and is also provided with a bearing 5 in this through hole, which is a slide bearing to support the main shaft 7. The bracket 4 on the opposite load side is provided with a bearing 6 that is a slide bearing to support the main shaft 7. The bracket 4 is also provided with a liquid inlet 4a formed to cause the bearing 6 to communicate with outside. This liquid inlet 4a is connected with a non-illustrated pressure-feed mechanism to supply the cleaning solution into the rotor chamber.

As shown by a thick one-dot chain line in FIG. 10, when the cleaning solution is supplied through the liquid inlet 4a to the bearing 6 on the opposite load side by the non-illustrated pressure-feed mechanism, the cleaning solution passes through between the bearing 6 and the main shaft 7 and moves into the rotor chamber 48. The cleaning solution subsequently passes through between the resin molded rotor 10A (the rotor 10) and the stator can 18 in the rotor chamber 48 and goes toward the bearing 5 on the load side. The cleaning solution then passes through between the bearing 5 and the main shaft 7 (through a liquid outlet) and is discharged into the casing 220.

In this fan scrubber 200, the resin molded rotor 10A of the canned motor 30 has a similar configuration to that of the embodiment described above and has similar functions and advantageous effects to those of the embodiment described above. More specifically, in the resin molded rotor 10A an O-ring 26 is placed between the resin mold 11 and the main shaft 7. Compared with the prior art configuration, this configuration more reliably maintains the sealing property at an interface between the resin mold 11 and the main shaft 7 and more reliably suppresses the rotor core and the permanent magnet from being exposed to or coming into contact with the liquid.

At least the following aspects are provided from the embodiments described above.

According to a first aspect, there is provided a resin molded rotor, comprising: a rotor configured to hold a magnet; a main shaft provided with the rotor mounted thereto and configured to transmit power to outside; and a resin mold configured to integrally cover the rotor and part of the main shaft on respective sides in an axial direction of the rotor, wherein an O-ring is placed between the resin mold and the main shaft to seal between the resin mold and the main shaft.

In the resin molded rotor of this aspect, the configuration of sealing an interface between the resin mold and the main shaft by means of the O-ring enhances the sealing property of the rotor by the resin mold. The O-ring made of rubber has high adhesion to the main shaft and the resin mold and is capable of following thermal deformation of the resin mold. Accordingly, even when the resin mold is shrunk relative to the rotor and the main shaft due to a difference of linear expansion coefficient, the O-ring is deformed following thermal deformation of the resin, so as not to form a clearance between the resin mold and the main shaft but to maintain adhesion to the resin mold and the main shaft. As a result, this configuration enhances the sealing property between the main shaft and the resin mold. Even when the rotor, the main shaft and/or the resin mold are thermally deformed during operation of the motor, the O-ring is deformed following thermal deformations of these members, so as not to form a clearance between the resin mold and the main shaft but to maintain adhesion to the resin mold and the main shaft. As a result, this configuration enhances the sealing property between the main shaft and the resin mold.

According to a second aspect, in the resin molded rotor of the first aspect, a groove may be formed in part of an outer circumferential surface of the main shaft covered with the resin mold, and the O-ring may be placed in the groove to seal between the resin mold and the main shaft.

In the resin molded rotor of this aspect, the configuration of placing the O-ring in the groove provided in the main shaft suppresses/ prevents the O-ring from being shifted from a desired position in the process of injection molding the resin and provides a stable sealing structure.

According to a third aspect, in the resin molded rotor of the second aspect, the O-ring may closely adhere to an end face of the rotor.

In the resin molded rotor of this aspect, the O-ring closely adheres to the main shaft and the resin mold, and no resin mold is present on the outer circumferential surface of the main shaft between the end face of the rotor and the O-ring. This configuration enhances the sealing property between the resin mold and the main shaft. This configuration also reduces a distance where the resin is present in a main shaft axial direction. This enhances the sealing property between the resin mold and the main shaft and also reduces the amount of the resin used.

According to a fourth aspect, in the resin molded rotor of either the second aspect or the third aspect, part of the groove may be arranged to overlap with the rotor in the axial direction.

This configuration reliably enables the O-ring to closely adhere to and to be fixed to the end face of the rotor.

According to a fifth aspect, in the resin molded rotor of any one of the second aspect to the fourth aspect, a plurality of the grooves may be provided in part of the outer circumferential surface of the main shaft covered with the resin mold, and the O-ring may be placed in each of all the grooves.

In the resin molded rotor of this aspect, the plurality of O-rings further enhance the sealing property between the main shaft and the resin mold.

According to a sixth aspect, in the resin molded rotor of any one of the second aspect to the fourth aspect, a plurality of the grooves may be provided, and the O-ring may not be placed in part of the grooves.

This configuration enables the resin mold to closely adhere to a side face of the groove where the O-ring is not placed by taking advantage of a difference between a linear expansion coefficient of the resin mold and a linear expansion coefficient of a material used to form the rotor. As a result, the combination of sealing by the O-ring with sealing by adhesion of the resin to the groove further enhances the sealing property between the main shaft and the resin mold.

According to a seventh aspect, in the resin molded rotor of the first aspect, the resin mold may be molded such as to form, together with the main shaft, an O-ring groove, and the O-ring may be placed in the O-ring groove.

This configuration enables the O-ring to be placed in the O-ring groove after molding of the resin mold. This configuration accordingly prevents a positional shift of the O-ring in the injection molding process of the resin mold and also prevents the O-ring from being affected by heat in the injection molding process.

According to an eighth aspect, the resin molded rotor of the seventh aspect may further comprise a protrusion that is protruded from an axial direction end face of the resin mold, and the O-ring groove may be formed between the protrusion and an outer circumferential surface of the main shaft.

In the resin molded rotor of this aspect, the O-ring groove is formed by the protrusion of the resin mold. This configuration has no necessity of forming thick the entire axial direction ends of the resin mold and thereby reduces the amount of the resin used. Furthermore, the configuration of suppressing the entire axial direction ends of the resin mold from being thickened suppresses/ prevents reduction of the sealing property of the resin mold to the rotor end face and suppresses/ prevents "sink" of the resin mold.

According to a ninth aspect, in the resin molded rotor of the eighth aspect, a groove may be provided in the outer circumferential surface of the main shaft at a position opposed to the protrusion, and the O-ring may be placed between the protrusion and the groove.

In the resin molded rotor of this aspect, the groove provided in the outer circumferential surface of the main shaft further more reliably suppresses displacement of the O-ring in the axial direction during operation of the motor.

According to a tenth aspect, in the resin molded rotor of any one of the first aspect to the ninth aspect, the O-ring may be provided on respective sides in the axial direction of the rotor.

This configuration enhances the sealing property at interfaces between the resin mold and the main shaft on both sides in the axial direction of the rotor where the interfaces between the resin mold and the main shaft are present.

According to an eleventh aspect, there is provided a canned motor, comprising: the resin molded rotor of any one of the first aspect to the tenth aspect; a bearing configured to rotate and support the main shaft of the resin molded rotor; and a stator of a canned structure configured to surround the resin molded rotor and to cause a rotating magnetic field to be applied to the rotor of the resin molded rotor.

This aspect configures the canned motor by using the resin molded rotor described above and thereby provides a long-life canned motor by the simple configuration at low cost.

According to a twelfth aspect, there is provided a canned motor pump, comprising: the canned motor of the eleventh aspect; an impeller fixed to the main shaft; and a pump casing configured to surround the impeller. The canned motor pump may be configured to suck/discharge a liquid and/or a gas.

This aspect configures the canned motor pump by using the resin molded rotor described above and thereby provides a long-life canned motor pump by the simple configuration at low cost.

According to a thirteenth aspect, there is provided a fan scrubber, comprising: the canned motor of the eleventh aspect; a fan connected with the main shaft of the canned motor; a casing provided with a gas intake port and a gas discharge port and configured to place the fan therein; and a nozzle configured to jet a liquid in the casing.

This aspect configures the fan scrubber by using the resin molded rotor described above and thereby provides a long-life fan scrubber by the simple configuration at low cost.

According to a fourteenth aspect, there is provided a vacuum pump apparatus, comprising: the fan scrubber of the thirteenth aspect; and a vacuum pump configured to suck a gas in vacuum from a vacuum chamber and to discharge a gas to the gas intake port of the fan scrubber.

This aspect configures the vacuum pump apparatus by using the fan scrubber that employs the resin molded rotor described above and thereby provides a long-life vacuum pump apparatus by the simple configuration at low cost.

Although the embodiments of the present invention have been described based on some examples, the embodiments of the invention described above are presented to facilitate understanding of the present invention, and do not limit the present invention. The present invention can be altered and improved without departing from the subject matter of the present invention, and it is needless to say that the present invention includes equivalents thereof. In addition, it is possible to arbitrarily combine or omit respective constituent elements described in the claims and the specification in a range where at least a part of the above-mentioned problem can be solved or a range where at least a part of the effect is exhibited.

The present application claims priority to Japanese patent application No. 2020-110723 filed on Jun. 26, 2020. The entire disclosure of Japanese patent application No. 2020-110723 filed on Jun. 26, 2020, including the specification, claims, drawings and abstract is incorporated herein by reference in its entirety.

The entire disclosure of Japanese Unexamined Patent Publication No. H07-312852 (Patent Document 1), Japanese Patent No. 5602615 (Patent Document 2), Japanese Patent No. 6298237 (Patent Document 3), and Japanese Patent No.

6461733 (Patent Document 4), including the specification, claims, drawings and abstract is incorporated herein by reference in its entirety.

REFERENCE SIGNS LIST 1 impeller
2 pump casing
3 bracket
4 bracket
5 bearing
6 bearing
7 main shaft
7a through hole
7-1 groove
7-2 groove
8-1 thrust disk
8-2 thrust disk
9 permanent magnet
10 rotor
10A resin molded rotor
11 resin mold
11A annular protrusion
11B O-ring groove
12 rotor core
13 motor frame
14 stator
15 stator core
16 electric conductor (coil)
17 outlet line
18 stator can
19 stator can lateral plate
19-1, 19-2 frame lateral plates (stator can lateral plates)
20-1 sealing member
20-2 sealing member
20-3 sealing member
21 bolt
22 bolt
23 blade lock nut
24 discharge volute
26 O-ring
30 canned motor
100 vacuum pump apparatus
110 canned motor pump
120 vacuum pump
140 detoxification device
200 fan scrubber
220 casing
220a gas intake port
220b gas discharge port
220c liquid discharge outlet
230 collision plate
240 fan
260 liquid discharge portion
270 nozzle
280 liquid supply pipe

What is claimed is:

1. A resin molded rotor, comprising:
a rotor configured to hold a magnet;
a main shaft provided with the rotor mounted thereto and configured to transmit power to outside; and
a resin mold configured to integrally cover the rotor and part of the main shaft on respective sides in an axial direction of the rotor;
one or more O-rings placed between the resin mold and the main shaft to seal between the resin mold and the main shaft;
one or more grooves formed in part of an outer circumferential surface of the main shaft covered with the resin mold,
wherein the one or more grooves comprise a first groove arranged to overlap with the rotor in the axial direction to extend over the end face of the rotor, and
the one or more O-rings comprise a first O-ring placed in the first groove to contact the end face of the rotor, the main shaft, and the resin mold, thereby sealing between the resin mold and the main shaft and between the resin mold and the rotor.

2. The resin molded rotor according to claim 1, wherein the one or more grooves comprise a plurality of grooves including the first groove, and
the one or more O-rings comprise a plurality of O-rings including the first O-ring, each of the plurality of grooves having one of the plurality of O-rings.

3. The resin molded rotor according to claim 1, wherein the one or more grooves further comprise a groove other than the first groove in which the O-ring is not placed.

4. The resin molded rotor according to claim 1, wherein the one or more O-rings comprise the first O-ring placed on a first axial end of the rotor and a second O-ring placed on a second axial end of the rotor.

5. A canned motor, comprising:
the resin molded rotor according to claim 1;
a bearing configured to rotate and support the main shaft of the resin molded rotor; and
a stator of a canned structure configured to surround the resin molded rotor and to cause a rotating magnetic field to be applied to the rotor of the resin molded rotor.

6. A canned motor pump, comprising:
the canned motor according to claim 5;
an impeller fixed to the main shaft; and
a pump casing configured to surround the impeller.

7. A fan scrubber, comprising:
the canned motor according to claim 5;
a fan connected with the main shaft of the canned motor;
a casing provided with a gas intake port and a gas discharge port and configured to place the fan therein; and
a nozzle configured to jet a liquid in the casing.

8. A vacuum pump apparatus, comprising:
the fan scrubber according to claim 7; and
a vacuum pump configured to suck a gas in vacuum from a vacuum chamber and to discharge a gas to the gas intake port of the fan scrubber.

* * * * *